United States Patent
Choi et al.

(10) Patent No.: US 9,565,391 B2
(45) Date of Patent: *Feb. 7, 2017

(54) PORTABLE TERMINAL WITH PROJECTOR AND METHOD FOR DISPLAYING DATA THEREON

(71) Applicant: Samsung Electronics Co., Ltd., Gyeonggi-do (KR)

(72) Inventors: Han Shil Choi, Seoul (KR); Ki Choon Gong, Seoul (KR); Tae Young Kim, Gyeonggi-do (KR); Sung Bae Kim, Gyoenggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 97 days.

This patent is subject to a terminal disclaimer.

(21) Appl. No.: 14/313,404

(22) Filed: Jun. 24, 2014

(65) Prior Publication Data

US 2014/0307041 A1 Oct. 16, 2014

Related U.S. Application Data

(63) Continuation of application No. 12/762,449, filed on Apr. 19, 2010, now Pat. No. 8,780,160.

(30) Foreign Application Priority Data

Apr. 20, 2009 (KR) .................. 10-2009-0034084

(51) Int. Cl.
*H04N 7/14* (2006.01)
*H04N 21/414* (2011.01)
*H04N 21/422* (2011.01)
*H04N 21/4223* (2011.01)
*H04N 21/4788* (2011.01)

(52) U.S. Cl.
CPC .............. *H04N 7/141* (2013.01); *H04N 7/142* (2013.01); *H04N 7/147* (2013.01); *H04N 21/41407* (2013.01); *H04N 21/4223* (2013.01); *H04N 21/42203* (2013.01); *H04N 21/4788* (2013.01); *H04N 2007/145* (2013.01)

(58) Field of Classification Search
CPC ... H04M 2203/20–2203/258; H04N 21/41407; H04N 21/42203; H04N 21/4223; H04N 21/4788; H04N 2007/145
USPC ................. 348/14.01–14.16; 370/259–271, 370/351–357; 455/412.1–426.2, 456.1–566, 455/550.1–560, 575.1–575.9, 90.1–90.3; 709/201–207, 217–248
See application file for complete search history.

(56) References Cited

U.S. PATENT DOCUMENTS

| | | | |
|---|---|---|---|
| 6,642,918 B2* | 11/2003 | Uchida | G06F 3/0481 345/156 |
| 6,697,569 B1* | 2/2004 | Gomez et al. | 386/201 |
| 6,793,352 B2* | 9/2004 | Karasawa et al. | 353/122 |
| 6,906,741 B2* | 6/2005 | Canova et al. | 348/14.08 |

(Continued)

*Primary Examiner* — Hemant Patel
(74) *Attorney, Agent, or Firm* — Cha & Reiter, LLC

(57) ABSTRACT

A portable terminal equipped with a projector and a method for displaying data using the portable terminal provides capabilities for both conferencing and video presentations. When a projection function is selected in the portable terminal while the portable terminal is making a video call with other portable terminal, presentation data that will be output via the projector is transmitted to another portable terminal. The presentation data and image data transmitted from the other portable terminal is output via the projector of the portable terminal.

20 Claims, 7 Drawing Sheets

(56) References Cited

U.S. PATENT DOCUMENTS

| | | |
|---|---|---|
| 7,266,772 B2* | 9/2007 | Miyashita et al. ............ 715/730 |
| 7,770,115 B2* | 8/2010 | Gallmeier ............... G06F 3/017 |
| | | 715/716 |
| 8,024,007 B2* | 9/2011 | Roberts et al. ............... 455/566 |
| 8,223,122 B1 | 7/2012 | Harris |
| 8,521,217 B2* | 8/2013 | Rodriguez ................ 455/550.1 |
| 8,780,160 B2* | 7/2014 | Choi et al. ................. 348/14.01 |
| 2003/0110217 A1* | 6/2003 | Raju ............................ 709/204 |
| 2004/0221230 A1* | 11/2004 | Kakemura .................... 715/526 |
| 2004/0236830 A1* | 11/2004 | Nelson et al. ................ 709/204 |
| 2006/0079214 A1* | 4/2006 | Mertama et al. .......... 455/414.1 |
| 2006/0256144 A1 | 11/2006 | Chung |
| 2007/0040993 A1 | 2/2007 | Yokoyama et al. |
| 2007/0159453 A1 | 7/2007 | Inoue |
| 2007/0229650 A1 | 10/2007 | McKay |
| 2007/0265717 A1 | 11/2007 | Chang |
| 2008/0079573 A1 | 4/2008 | Bloebaum et al. |
| 2008/0189365 A1 | 8/2008 | Narayanaswami et al. |
| 2008/0268900 A1 | 10/2008 | Lee |
| 2009/0181645 A1* | 7/2009 | Chan et al. ................. 455/412.1 |
| 2009/0295712 A1 | 12/2009 | Ritzau |
| 2010/0188428 A1 | 7/2010 | Shin et al. |

\* cited by examiner

PORTABLE TERMINAL WITH PROJECTOR AND METHOD FOR DISPLAYING DATA THEREON

CROSS REFERENCE TO RELATED APPLICATIONS AND CLAIM OF PRIORITY

This present disclosure is a continuation application claiming the benefits under 35 U.S.C. §120 of U.S. patent application Ser. No. 12/762,449 filed Apr. 9, 2010,which issued as U.S. Pat. 8,780,160 on Jul. 15, 2015,and through which Applicant claims the benefits of priority from Korean Patent Application No. 10-2009-0034084 filed Apr. 20, 2009,the contents of which are hereby incorporated by reference in its entirety.

BACKGROUND OF THE INVENTION

1. Field of the Invention

The present invention relates to video functions of portable terminals. More particularly, the present invention relates to a portable terminal equipped with a projector and a method for displaying the data via the projector.

2. Description of the Related Art

With the development of science and technology, portable terminals have been equipped with a variety of functions so that they can provide various services. Examples of such functions include a digital broadcasting function, an MP3 file playback function, a moving image reproducing function, an image preview function, a camera function, etc. Portable terminals also allow users to identify or create various types of data using their functions.

Conventional portable terminals are equipped with a display unit that is relatively small, as compact size and minimal weight are among some of the features most desired by consumers for portability. In other words, the display unit is small in size, conventional portable terminals have a limitation to display images or moving images when reproducing image data or moving image data. To resolve this problem, some portable terminals have been equipped with a projector for enlarging and outputting still or moving images that are normally displayed on the display unit. Such portable terminals with a projector have recently been used for outputting data at conferences or presentation sites where an overhead projector is not installed, using the projector module of the portable terminal.

In general, a person who does not physically attend a meeting or presentation may still participate in the meeting or presentation, using a conference call function of the portable terminals with a projector. An example of the conference call function includes a video call function, etc. However, the conventional portable terminals are disadvantageous in that, if a conference call function is executed while the projector is outputting data, the projector is turned off. In that case, other people attending the meeting and presentation cannot view data output from the portable terminals. Also, other people who attend the meeting or presentation using a conference call cannot view the data.

SUMMARY OF THE INVENTION

The present invention provides a portable terminal equipped with a projector that can permit conferencing and video projection at the same time.

The present invention further provides a method for displaying data via the projector of the portable terminal while the portable terminal is making a video call.

In accordance with an exemplary embodiment of the present invention, the present invention provides a method for displaying data through a portable terminal equipped with a projector, the method preferably including: transmitting, if a projection function is selected in the portable terminal while the portable terminal is making a video call with another portable terminal, presentation data that will be output via the projector to the other portable terminal; and outputting the presentation data and image data transmitted from the other portable terminal, via the projector of the portable terminal.

A method for displaying data through a first portable terminal equipped with a projector preferably includes: the first portable terminal transmitting presentation data to a second portable terminal for output by the second portable terminal, if a projection function is selected in the first portable terminal while the first portable terminal is performing a video call function with the second portable terminal, and the first portable terminal receiving image data from the second portable terminal; and the first portable terminal outputting via the projector (1) the presentation data, and (2) the image data received from the second portable terminal.

In accordance with another exemplary embodiment of the present invention, the present invention provides a method for displaying data through a portable terminal equipped with a projector, the method preferably including: determining whether a conference call function is performed to transmit presentation data from the portable terminal to another portable terminal while the presentation data is being output via the projector of the portable terminal; transmitting the presentation data to the other portable terminal that is connected to the portable terminal according a conference call; and outputting image data, transmitted from the other portable terminal, and the presentation data via the projector.

In accordance with yet another exemplary embodiment of the present invention, the present invention provides a portable terminal that projects data, preferably including: a projector for outputting presentation data selected by a user; an RF communication unit for transmitting the presentation data to another portable terminal connected to the portable terminal and receiving data from the other portable terminal; and a controller for performing a projection function to output the presentation data via the projector, transmitting the presentation data via the RF communication unit, and outputting the presentation data via the projector.

BRIEF DESCRIPTION OF THE DRAWINGS

The patentable features and advantages of the present invention will become more apparent from the following detailed description in conjunction with the accompanying drawings, in which.

DETAILED DESCRIPTION

Figure 1:
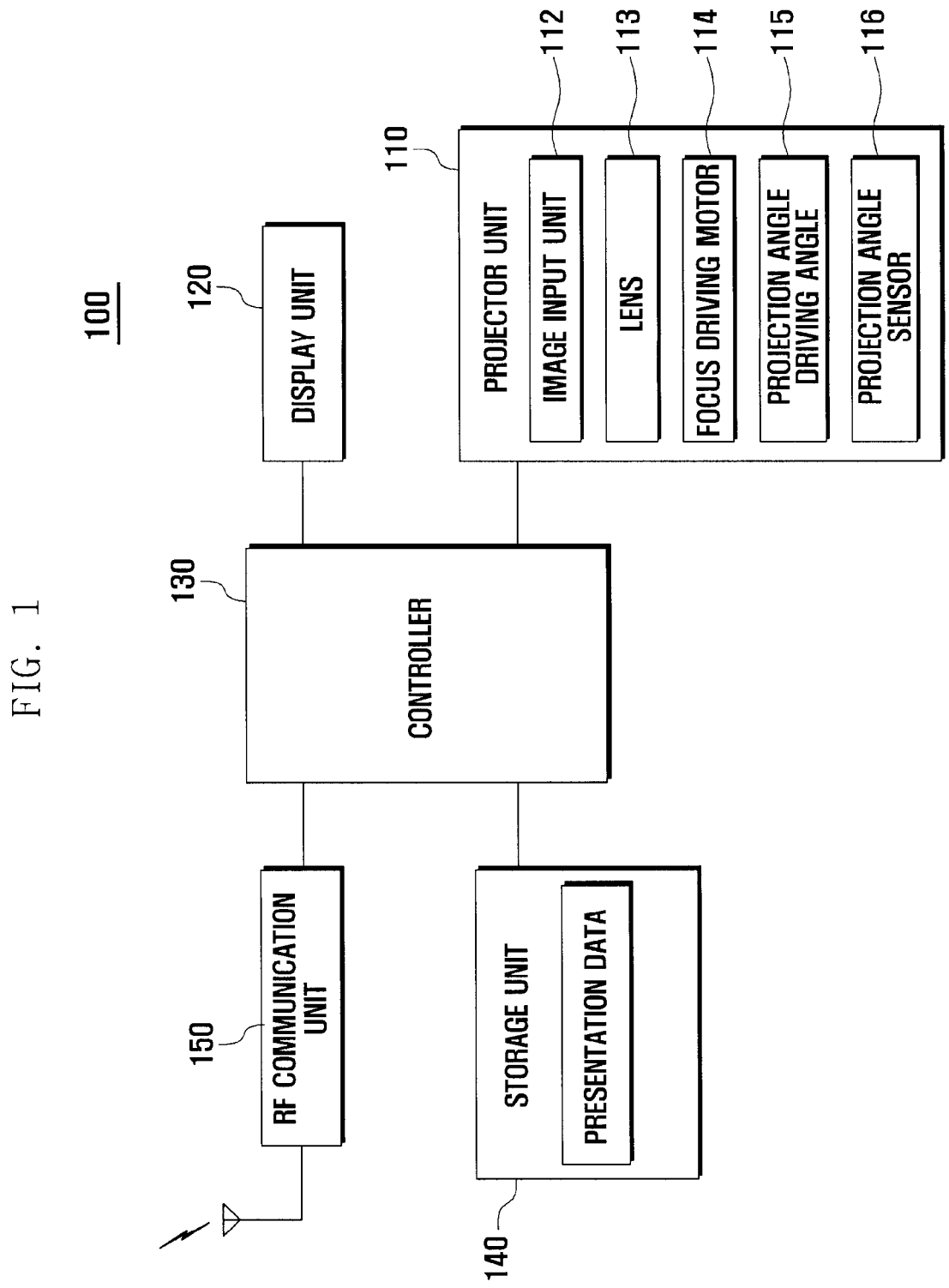
FIG. 1 is a schematic block diagram illustrating a portable terminal according to an exemplary embodiment of the present invention.

Prior to discussing some exemplary embodiments of the present invention, terminologies will be defined for the present description below. The terms or words described in the present description and the claims should not be limited by a general or lexical meaning, instead should be analyzed as a meaning and a concept through which the inventor defines and describes the present invention at his most effort, to comply with the idea of the present invention. Therefore, one skilled in the art will understand that the exemplary embodiments disclosed in the description and configurations illustrated in the drawings are only preferred exemplary embodiments, and there are various modifications, alterations, and equivalents thereof that can be made to the exemplary embodiments shown and described herein that are within the spirit of the invention and the scope of the appended claims.

The term 'data' refers to information generated in a portable terminal and downloaded from external systems. Examples of data include presentation data output from a projector installed to a portable terminal, and image data transmitted between portable terminals during the video call, etc.

The term 'presentation data' refers to all types of data output from a portable terminal equipped with a projector. Examples of presentation data include text data, digital broadcast data, audio data, moving image data, image data, etc. In an exemplary embodiment of the present invention, it is assumed that the presentation data is data used at a meeting or presentation, and has formats such as .ppt, .doc, .hwp, etc.

The term 'image data' refers to images, captured by a camera of the portable terminals and transmitted between the portable terminals during the video call, or images stored in the portable terminals.

The term 'conference call function' refers to a function that allows a user to make a voice or video call with people who do not physically attend a meeting or presentation by performing a conversation and transmits presentation data output from the projector of the portable terminal to the people who do not attend a meeting or presentation. In an exemplary embodiment of the present invention, it is assumed that the conference call function is a video call function where a portable terminal is communicated with other portable terminals by transmitting and receiving voice and image data therebetween.

Hereinafter, exemplary embodiments of the present invention are described in detail with reference to the accompanying drawings. In the drawings, the same or similar elements are denoted by the same reference numerals even though they are depicted in different drawings. In the following description, a detailed description of well-known functions and configurations incorporated herein may be omitted when their inclusion would obscure appreciation of the subject matter of the present invention by a person of ordinary skill in the art.

FIG. 1 is a schematic block diagram illustrating a portable terminal according to an exemplary embodiment of the present invention.

Referring now to FIG. 1, the portable terminal 100 includes a projector 110, a display unit 120, a controller 130, a storage unit 140, and an RF communication unit 150.

The projector 110 serves to output various types of data to an external screen. Examples of the data includes data stored in the portable terminal 100, data received when the portable terminal 100 performs a digital broadcast function (such as a digital multimedia broadcasting (DMB) function, etc.), data received from a variety of external video devices connectable to the portable terminal 100 (such as a personal computer, a TV, a VCR, a DVD player, a video camera, data generated when the portable terminal 100 is operated, etc.). The projector 110 may output presentation data, according to a user's selection, under the control of the controller 130. If the portable terminal 100 makes a video call when outputting the presentation data, the projector 110 can output image data, transmitted from the other portable terminal, as well as the presentation data, under the control of the controller 130.

The projector 110 includes a video image input unit 112 (hereafter "image input unit"), a lens 113, a focus driving motor 114, a projection angle driving motor 115, and a projection angle sensor 116. The image input unit 112 receives data from the controller 130. The lens 113 serves to project the received data to the external screen. The focus driving motor 114 adjusts a focus of the lens 113 on the external screen. The projection angle driving motor 115 adjust the projection angle for data to be projected on the external screen. The projection angle sensor 116 detects the projection angle of the image to be projected on the external screen and outputs the image to the controller 130.

The display unit 120 displays various types of information related to the states and functions of the portable terminal 100. The display unit 120 may be implemented with a liquid crystal display (LCD), an organic light emitted diode (OLED), etc., or any other type of thin film technology. If, for example, the LCD or OLED is implemented with a touch screen, the display unit 120 may also serve as an input device. The display unit 120 displays presentation data via the projector 110 under the control of the controller 130. The display unit 120 may also display image data, transmitted from other portable terminal, according to a user's selection, under the control of the controller 130.

The controller 130 typically controls the entire state and operation of the elements in the portable terminal 100. When a user selects a projection function, the controller 130 drives the projector 110. The controller 130 controls the RF communication unit 150 and outputs presentation data according to a user's selection via the projector 110. When the portable terminal 100 is making a video call, the controller 130 controls the RF communication unit 150 and transmits presentation data to the other portable terminal, instead of image data received via the camera. To this end, the controller 130 modulates the presentation data in the video call format, such as H.263, H.264, MPEG4, etc., using a video codec. When the portable terminal 100 transmits the presentation data to the other portable terminal, user data thereto is also transmitted thereto under the control of the controller 130. The user data contains an identifier of the portable terminal 100, type of data to be transmitted, transmission time, etc. The type of data refers to information to identify whether the data comprises presentation data output from the projector 110, an image for a video call received by a camera, or an image stored in the portable terminal 100. Alternatively, when the portable terminal 100 receives presentation data, the controller 130 determines whether to output the presentation data via the projector 110, based on user data received together with the presentation data.

While outputting the presentation data via the projector 110, the controller 130 can also output image data transmitted from the other portable terminal by controlling the RF communication unit 150. In particular, the portable terminal 100 makes a video call to the other portable terminal according to a use's selection, under the control of the controller 130. When a user selects a projection function and presentation data that will be output via the projector 110, the controller 130 modulates the selected presentation data in the video call format and then transmit it to the other portable terminal. After that, the controller 130 outputs image data transmitted from the other portable terminal, and the presentation data via the projector 110. When the projector 110 is turned off according to a user's selection, the controller 130 displays an image received via the camera or an image selected by the user on the display unit 120. Alternatively, if the presentation data has been output, the controller 130 can output an image received via the camera or an image selected by the user, instead of the presentation data, via the projector 110. The controller 130 can also transmit the image received via the camera or the image selected by the user to the other portable terminal.

When the portable terminal 100 receives presentation data from another portable terminal (i.e. a second portable terminal), the controller 130 outputs the received presentation data via the projector 110. To this end, the controller 130 identifies the type of received data through the user data that is transmitted together with the presentation data from the other portable terminal. If the type of received data corresponds to the type of presentation data, the controller 130 drives the projector 110 and then outputs the presentation data via the projector 110. The controller 130 transmits a user's image, acquired by the camera, or a stored image, according to a user's selection, to the other portable terminal. Also, the controller 130 can transmit the presentation data, such as text data, according to a user's selection to the other portable terminal.

In an exemplary embodiment of the present invention described above, although the controller 130 first performs a video call function and, if the projector 110 is operated, transmits the presentation data to the other portable terminal, a person of ordinary skill in the art should understand that the present invention is not limited to the exemplary embodiment described hereinabove. For example, while outputting the presentation data via the projector 110, the controller 130 may also perform a conference call function according to a user's selection. A conference call function refers to a function where a portable terminal (first portable terminal) sends or receives a call to or from another portable terminal (a second portable terminal) according to a user's selection and accordingly transmits the presentation data, output via the projector 110, to the other (second) portable terminal. In an exemplary embodiment of the present invention, the conference call function is assumed to be an outgoing or incoming video call function. However, it is within the spirit and scope of the claimed invention that the conference call function can be, for example, only an audio conference. If the portable terminal 100 performs a conference call function when the presentation data is output via the projector 110, the controller 130 controls the RF communication unit 150 and transmits the output presentation data to the other portable terminal.

With continued reference to FIG. 1, the storage unit 140 comprises a machine readable medium for storing application programs related to functions operated in the portable terminal 100. The storage unit 140 also stores data generated when the portable terminal 100 is operated. In an exemplary embodiment of the present invention, the storage unit 140 stores presentation data output via the projector 110 under the control of the controller 130. The storage unit 140 also stores image data that will be transmitted to the other portable terminal during the video call.

The RF communication unit 150 establishes communication channels for a voice call and for the transmission of data, such as video data, under the control of the controller 130. The RF communication unit 150 establishes a voice call channel, a video call channel, a data communication channel, etc. among mobile communication systems. To this end, the RF communication unit 150 is configured to include an RF transmitter for up-converting the frequency of transmitted signals and amplifying the transmitted signals and an RF receiver for low-noise amplifying received RF signals and down-converting the frequency of the received RF signals.

For example, if a video call channel is established, the RF communication unit 150 transmits presentation data to the other portable terminal under the control of the controller 130. In that case, the RF communication unit 150 may also output image data, transmitted from the other portable terminal, to the controller 130.

A person of ordinary skill in the art should understand that the portable terminal 100 may further include a variety of elements, including but in no way limited to a camera unit for capturing images, a digital multimedia broadcast (DMB) unit for receiving digital broadcast signals, an Internet unit for communicating with an Internet network, etc.

Figure 2:
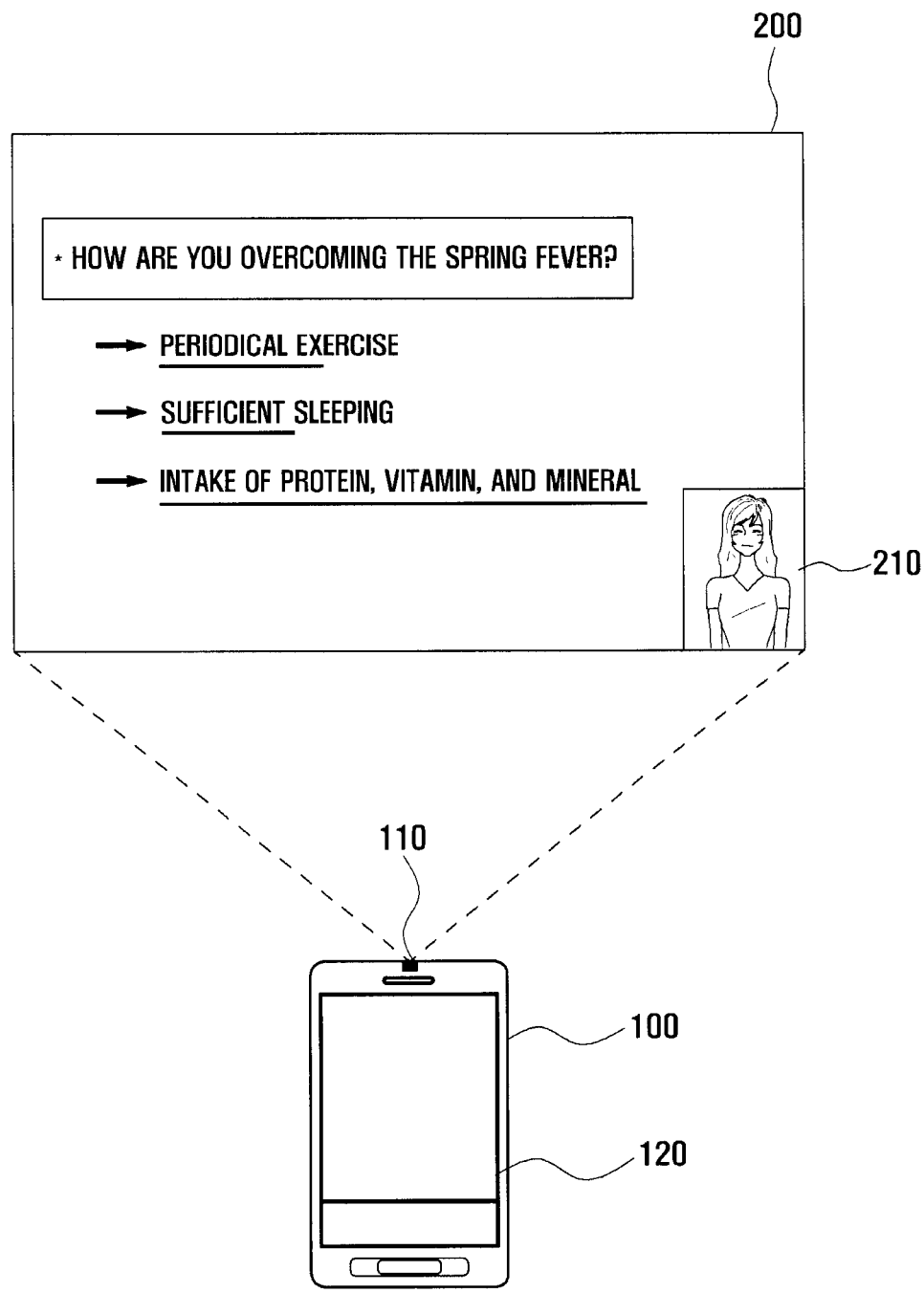
FIG. 2 is a screen showing presentation data via a projector according to an exemplary embodiment of the present invention.

FIG. 2 is a screen showing presentation data via a projector of a portable terminal according to an exemplary embodiment of the present invention.

Referring now to FIG. 2, the portable terminal 100 displays presentation data 200 on an external screen via its projector 110. The portable terminal 100 can also display an image data 210 transmitted from the other portable terminal, for example, on the bottom side of the screen displaying the presentation data 200. The size ratio of the presentation data 200 to the image data 210 displayed on the screen may be set at a default determined by or adjusted by a user's selection. The image data 210 may be located at a certain position on the screen, according to a user's selection. The image data 210 may overlap the presentation data 200 according to a user's selection. In an exemplary embodiment of the present invention, although the image data 210 is located at the bottom right of the screen displaying the presentation data 200, a person of ordinary skill in the art should be understand that the present invention is not limited to the exemplary embodiment shown and described. For example, the image data 210 may also be located at the upper portion of the screen displaying the presentation data 200.

Figure 3:
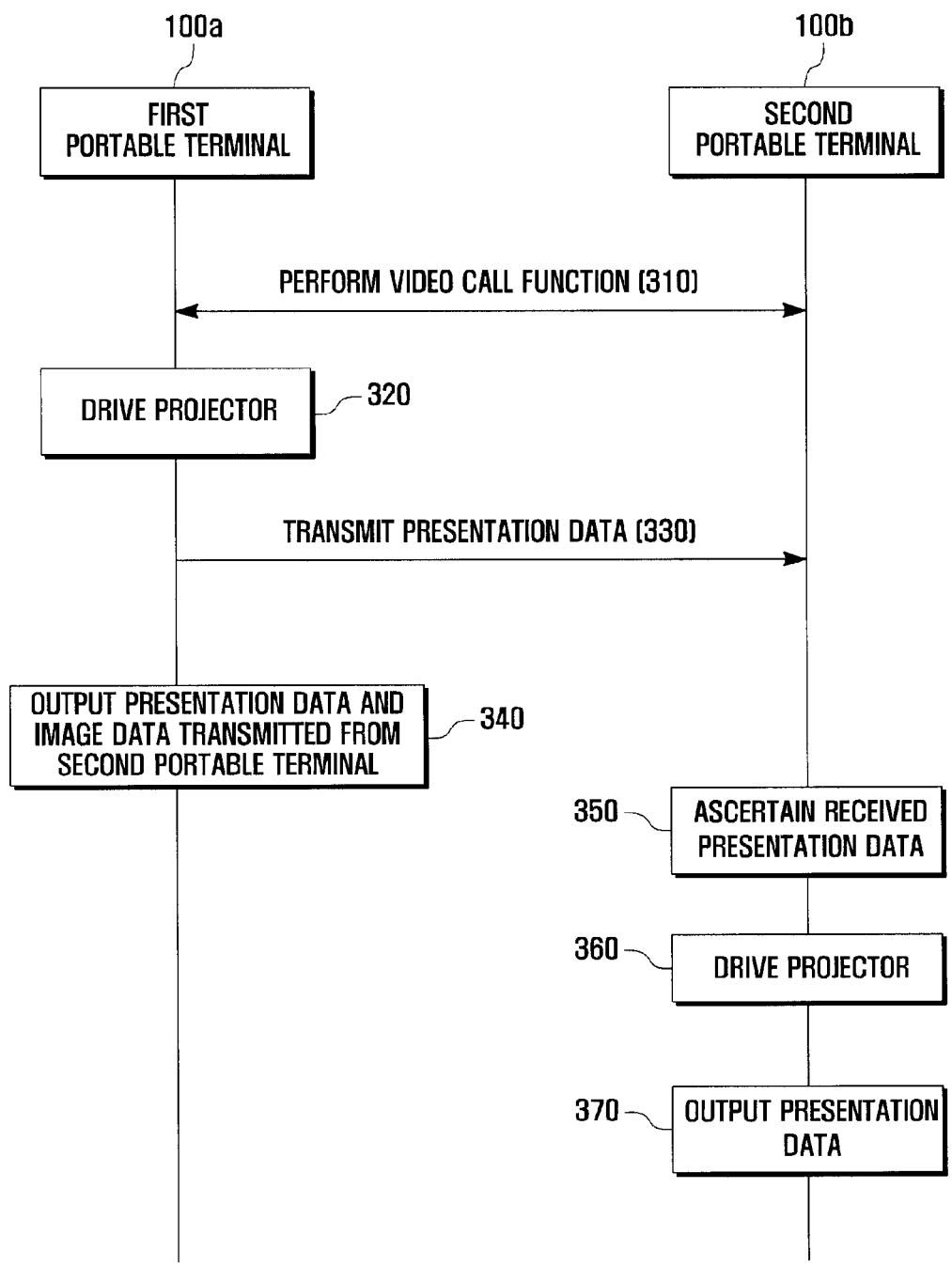
FIG. 3 is a signal flow chart that illustrates exemplary operation of a method for displaying data between portable terminals, according to an exemplary embodiment of the present invention.

FIG. 3 is a signal flow chart that describes a method for displaying data between portable terminals, according to an embodiment of the present invention. In an exemplary embodiment of the present invention, a first portable terminal 100a and a second portable terminal 100b are both assumed to have a projector 110.

Referring now to FIG. 3, at step (S310) the first portable terminal 100a transmitting presentation data and the second portable terminal 100b receiving the presentation data perform a video call function. The video call function refers to a function where voice data and image data are acquired by a camera, and/or stored image data are transmitting between portable terminals.

When a user of the first portable terminal 100a selects a projection function and presentation data that will be output via the projector 110 of the first portable terminal 100a, at step (S320) the first portable terminal 100a drives the projector 110.

At step (S330), the first portable terminal 100a transmits the presentation data selected by the user to the second portable terminal 100b. To this end, the first portable terminal 100a modulates the presentation data and generates packets in the video call format, such as H.263, H.264, MPEG4, etc., using a video codec. The first portable terminal 100a transmits the modulated packets and user data to the second portable terminal 100b. The user data contains information regarding type of data that will be transmitted to the second portable terminal 100b, an identifier of the first portable terminal 100a, data transmission time, etc. The type of data includes presentation data output from the projector 110, image data acquired by a camera, and image data selected by a user.

At step (S340), the first portable terminal 100a outputs the image data, transmitted from the second portable terminal 100b, and the presentation data via the projector 110.

At step (S350), the second portable terminal 100b receives the presentation data from the first portable terminal 100a and ascertains that the type of received data corresponds to presentation data. That is to say that when the second portable terminal 100b receives the presentation data from the first portable terminal 100a, the second portable terminal 100b identifies whether the type of received data is presentation data output from the projector 110 or image data transmitted to make a video call. To this end, the second portable terminal 100b checks user data transmitted together with the data. After ascertaining the type of data contained in the user data, the second portable terminal 100b determines whether to output the received presentation data via a projector 110 of the second portable terminal 100b or to display the presentation data on a display unit 120 of the second portable terminal 100b.

With continued reference to FIG. 3, at step (S360), the second portable terminal 100b drives its own projector 110. At step (S370), the second portable terminal 100b outputs the presentation data, transmitted from the first portable terminal 100a, via the projector 110 of the second portable terminal. In an exemplary embodiment of the present invention, although the second portable terminal 100b is equipped with a projector 110, a person of ordinary skill in the art should be understand that the present invention is not limited to this exemplary embodiment. If the second portable terminal 100b does not have a projector, then the second portable terminal 100b can display the received presentation data on its own display unit.

In the following description, a method for displaying presentation data on the portable terminal 100 is explained in detail with reference to FIG. 4. It is presumed that the portable terminal 100 is the first portable terminal 100a for explanatory purposes.

Figure 4:
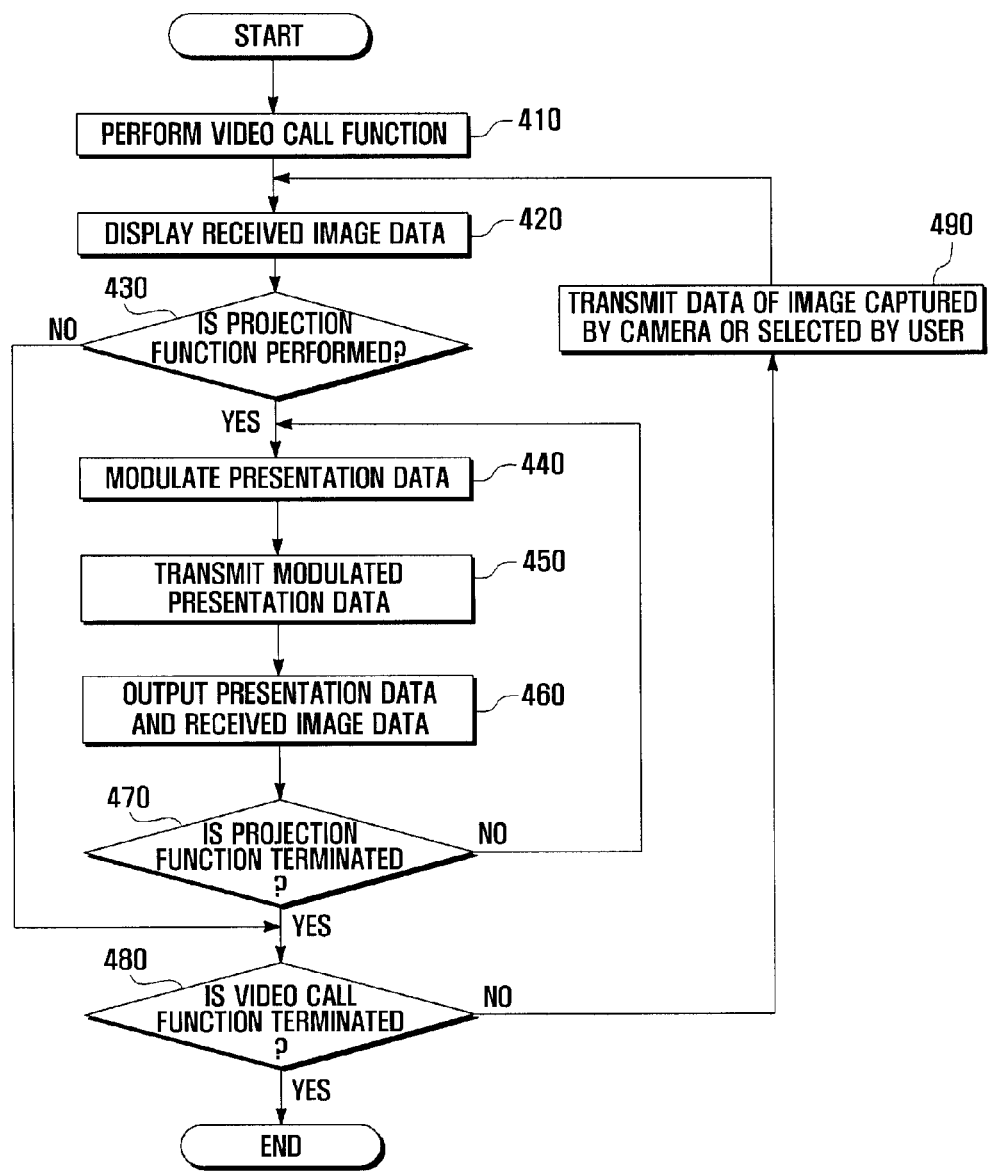
FIG. 4 is a flow chart that illustrates exemplary operation of a method for outputting presentation data according to an exemplary embodiment of the present invention.

FIG. 4 is a flow chart that describes a method for outputting presentation data according to an exemplary embodiment of the present invention.

Referring now to FIG. 4, when a user selects a video call function, at step (S410) the first portable terminal 100a makes a video call with the second portable terminal 100b corresponding to the phone number input by the user or with a calling portable terminal.

At step (S420), the portable terminal 100a receives and displays image data transmitted from the second portable terminal 100b.

At step (S430), the first portable terminal 100a determines whether a projection function is selected. When the first portable terminal 100a ascertains that a user has selected a projection function and presentation data that will be output via the projector 110 at step (S430), then at step (S440) the first portable terminal modulates the presentation data in the format of packets. That is, the portable terminal 100 modulates the presentation data in the video data packets.

At step (S450), the portable terminal 100 transmits the presentation data modulated in the format of packets to the second portable terminal 100b.

At step (S460), the first portable terminal 100a outputs the presentation data via the projector 110. Simultaneously, the first portable terminal 100a also outputs image data transmitted from the second portable terminal 100b. In that case, when the first portable terminal 100a outputs the presentation data via its projector 110 at a meeting or presentation, the presentation data can be shared with people who do not attend the meeting or presentation.

After that, at step (S470), the first portable terminal 100a determines whether the projection function is terminated. If the first portable terminal 100a ascertains that the projection function is not terminated at step (S470), the method returns to and proceeds with step (S440).

On the contrary, if at step (S470) the first portable terminal 100a ascertains that the projection function is terminated, then at step (S480) the first portable terminal 110a further checks whether a video call function is terminated.

If the first portable terminal 100a ascertains that a video call function is not terminated at step (S480), then at step (S490) the first portable terminal 100a transmits image data, acquired by a camera, or stored image data, to the second portable terminal 100b, according to a user's selection. After that, the first portable terminal 100a may display image data, transmitted to or from the other portable terminal, on the display unit 120 at 420.

On the contrary, if the first portable terminal 100a ascertains that a video call function is terminated at step (S480), the first portable terminal 100a terminates the procedure for outputting presentation data.

Meanwhile, when the first portable terminal 100a ascertains that a user has not selected a projection function and presentation data that will be output via the projector 110 at 430, first portable terminal 100a proceeds with step 480.

In the foregoing description, a method has been explained where the first portable terminal 100a (preferably having a construction as the portable terminal 100 shown in FIG. 1) transmits presentation data displays the presentation data and image data transmitted from the second portable terminal 110b. In an exemplary embodiment of the present invention described above, although the first portable terminal 100a transmits the presentation data to the second portable terminal 100b if a projection function is selected during the video call, a person of ordinary skill in the art should understand that the present invention is not limited to the exemplary embodiment. For example, the first portable terminal 100a can also transmit the presentation data to the second portable terminal 100b if a video call function as a conference call function is selected while performing the projection function. In that case, the first portable terminal 100*a* can also output the image data, transmitted from the second portable terminal 100*b*, as well as the presentation data, via the projector 110. A description will be provided, later, regarding the method for transmitting presentation data, using a conference call function, while a portable terminal is performing a projection function, with reference to FIGS. 6 and 7.

In the following description regarding a method for displaying presentation data while a portable terminal 100 (first portable terminal 100*a*) is receiving the presentation data, with reference to FIG. 5.

Figure 5:
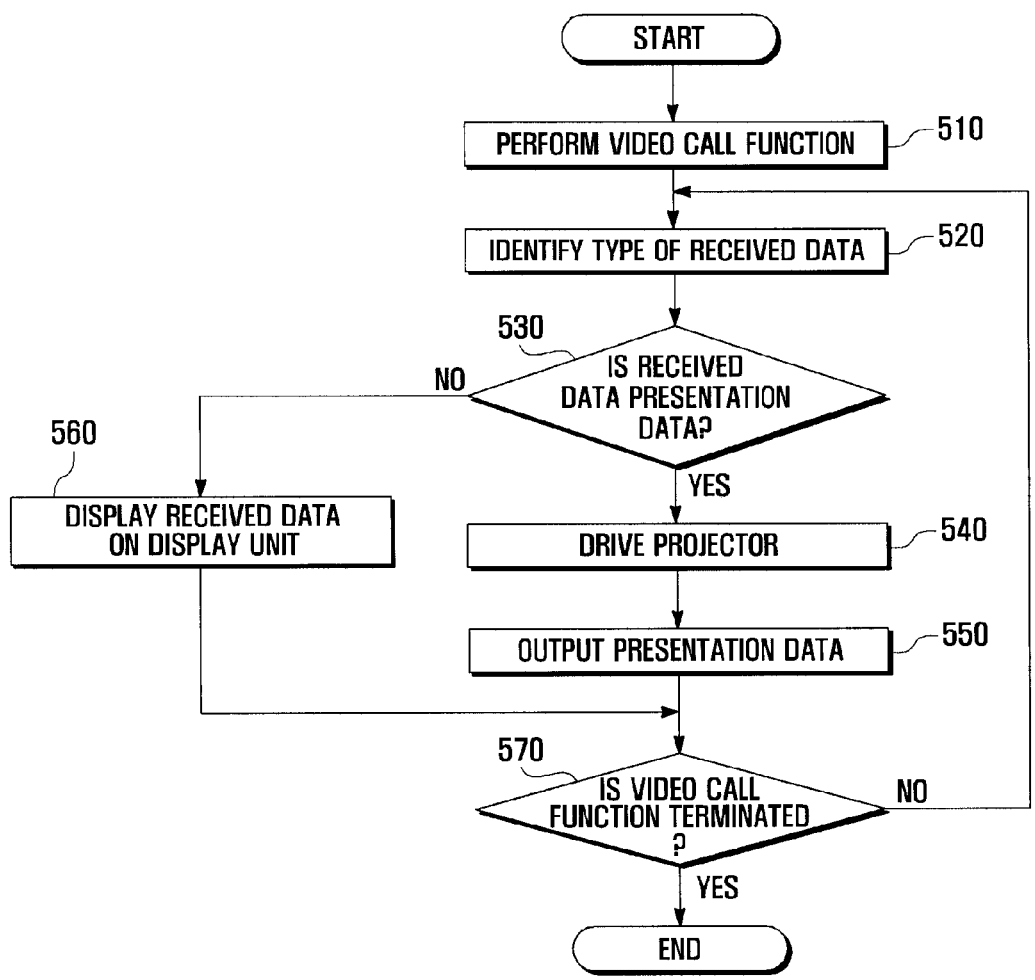
FIG. 5 is a flow chart that illustrates exemplary operation of a method for displaying received presentation data, according to an exemplary embodiment of the present invention.

FIG. 5 is a flow chart that describes a method for displaying received presentation data, according to an exemplary embodiment of the present invention.

Referring now to FIG. 5, at step (S510), when a user selects a video call function, the first portable terminal 100*a* makes a video call with the second portable terminal 100*b* corresponding to the phone number input by the user or with a calling portable terminal.

At step (S520), the first portable terminal 100*a* ascertains that the type of data transmitted from the second portable terminal 100*b*. That is, when the first portable terminal 100*a* receives data from the second portable terminal 100*b*, the first portable terminal 100*a* identifies the type of received data, based on user data that is transmitted together with the data. The user data refers to information transmitted together with data while the first portable terminal 100*a* performs a communication function. The user data contains an identifier of the portable terminal 100, information regarding the type of data to identify whether the data is data for a video call, data for a voice call, or presentation data output via the projector.

At step (S530), the first portable terminal 100*a* determines whether the type of received data is presentation data. If the type of received data is presentation data at 530, then at step (S540) the first portable terminal 100*a* drives a projector 110.

At step (S550), the first portable terminal 100*a* outputs the received presentation data via the projector 110.

On the contrary, at step (S560) if is determined back at step (S530) that the type of received data is not presentation data, but image data, then at step (S560) the first portable terminal 100*a* displays the received image data on the display unit 120.

After outputting the received presentation data via the projector 110 at step (S550) or displaying the received image data on the display unit 120 at step (S560), then at step (S570) the first portable terminal 100*a* determines whether a video call function has terminated.

If the user has selected to terminate a video call function at step (S570), the first portable terminal 100*a* terminates the procedure for displaying the presentation data. Otherwise, the first portable terminal 100*a* returns to and proceeds with step (S520) to display the received data on the display unit 120 or via the projector 110.

Alternatively, when the first portable terminal 100*a* receives presentation data, the first portable terminal 100*a* automatically drives its projector 110 and then outputs the received presentation data. Although not shown in the drawings, the first portable terminal 100*a* may display a pop-up message on the display unit 120 that indicates the type of received data is presentation data. The first portable terminal 100*a* may also display a selection window asking whether the presentation data is output via the projector 110 or displayed on the display unit 120. The first portable terminal 100*a* can output the presentation data via the projector 110 or display the presentation data on the display unit 120, according to a user's selection.

In the exemplary embodiment of the present invention described above, a description has been provided regarding a method for displaying data through the portable terminal when a video call is performed and then a projector is driven. The following description will be provided regarding a method for displaying data when the portable terminal receives an incoming video call or makes an outgoing video call while the projection function is being performed, with reference to FIGS. 6 and 7.

Figure 6:
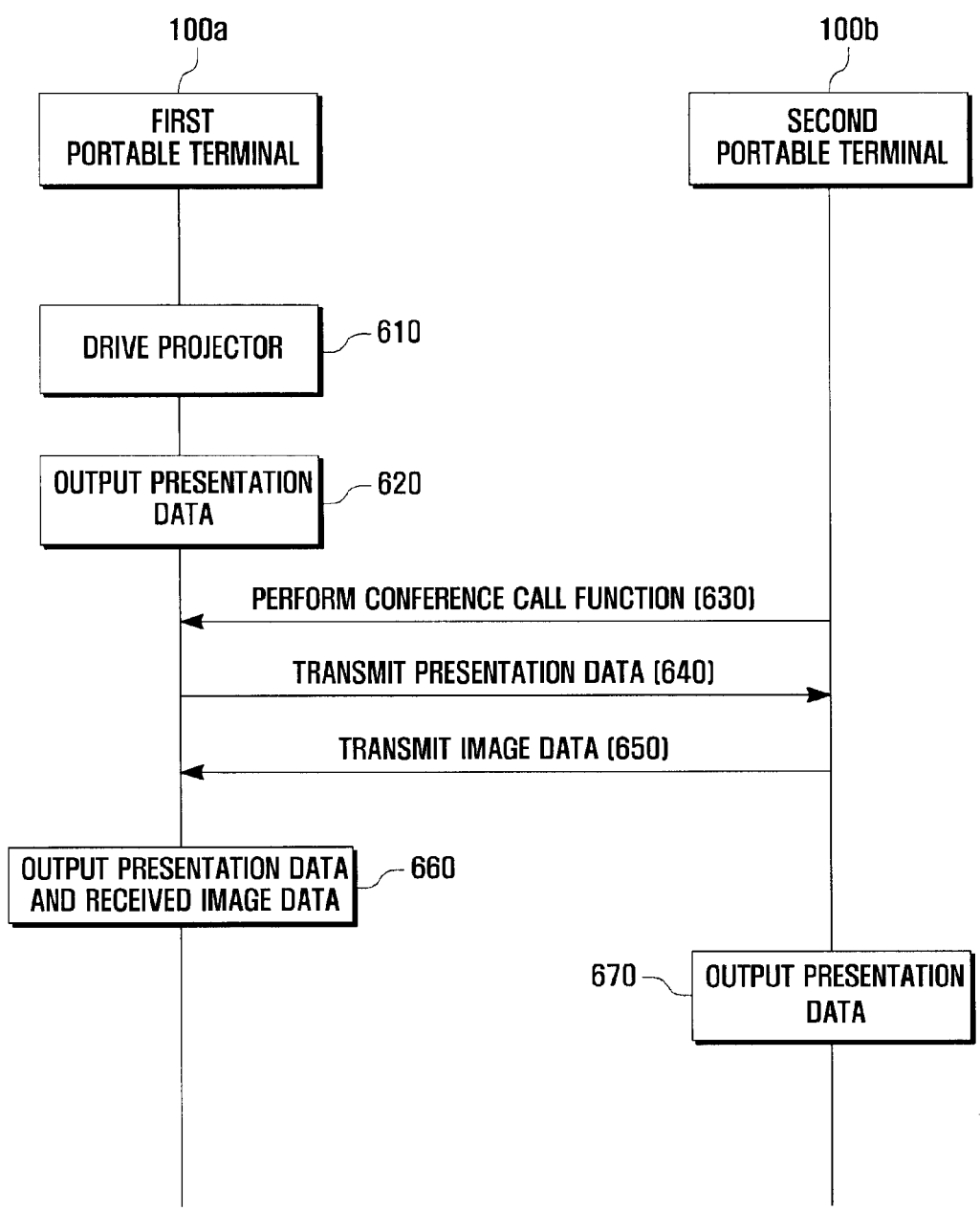
FIG. 6 is a signal flow chart that illustrates exemplary operation of a method for displaying data between portable terminals, according to another exemplary embodiment of the present invention.

FIG. 6 is a signal flow chart that describes a method for displaying data between portable terminals, according to another exemplary embodiment of the present invention.

Referring now to FIG. 6, at step (S610) when a user selects a projection function, the first portable terminal 100*a* drives its projector 110.

At step (S620), the first portable terminal 100*a* outputs the presentation data selected according to a user's selection via the projector 110.

After that, when a conference call function is selected, at step (S630) the first portable terminal 100*a* makes a conference call with second portable terminal 100*b* connected thereto. The conference call function refers to a function where the first portable terminal 100*a* receives a video call request signal from the second portable terminal 100*b* or makes a video call with the second portable terminal 100*b* corresponding a phone number input by the user, and transmits the presentation data, output via the projector 110, to the second portable terminal 100*b*. In an exemplary embodiment of the present invention, if the first portable terminal 100*a* receives a video call request signal from the second portable terminal 100*b*, the first portable terminal 100*a* may display the other user's phone number and a message indicating that an incoming video call has been received. After that, the first portable terminal 100*a* displays a selection window asking whether the received video call corresponds to a video call to share the presentation data output via the projector 110 or a video call for other use. The user may determine whether to transmit the presentation data via the projector 110 through the displayed window.

At step (S640), the first portable terminal 100*a* transmits the presentation data to the second portable terminal 100*b*. Since the method for transmitting presentation data has be already explained referring to FIGS. 3 and 4, its detailed description will be omitted in the following part.

At step (650), the first portable terminal 100*a* receives image data from the second portable terminal 100*b*. The first portable terminal 100*a* controls the projector 110 to output the presentation data and the received image data. The image data, transmitted from the other portable terminal, may be overlapped and displayed on the screen displaying the presentation data.

At step (S670), the second portable terminal 100*b* receives the presentation data and outputs the present data. If the second portable terminal 100*b* is equipped with a projector, the second portable terminal 100*b* outputs the presentation data, transmitted from the first portable terminal 100*a*, via the projector of the second portable terminal 100*b*. On the other hand, if the second portable terminal 100*b* does not have a projector, the second portable terminal 100*b* can display the received presentation data on its display unit (or may optionally use this display unit). If the second portable terminal 100*b* outputs the received presentation data via its projector, the second portable terminal 100*b* needs to identify the type of data transmitted from the first portable terminal 100*a*, based on user data that is transmitted together with the presentation data. The type of data is image data for a video call or presentation data that will be output via the projector. If the type of received data is presentation data, the second portable terminal 100b drives its projector and then output the received presentation data therethrough. Since the method for outputting presentation data has already explained Referring to FIG. 5, its detailed description will be omitted.

In the following, a description is provided regarding a method for outputting presentation data of the first portable terminal 100a and image data from the second portable terminal 100b, with reference to FIG. 7.

Figure 7:
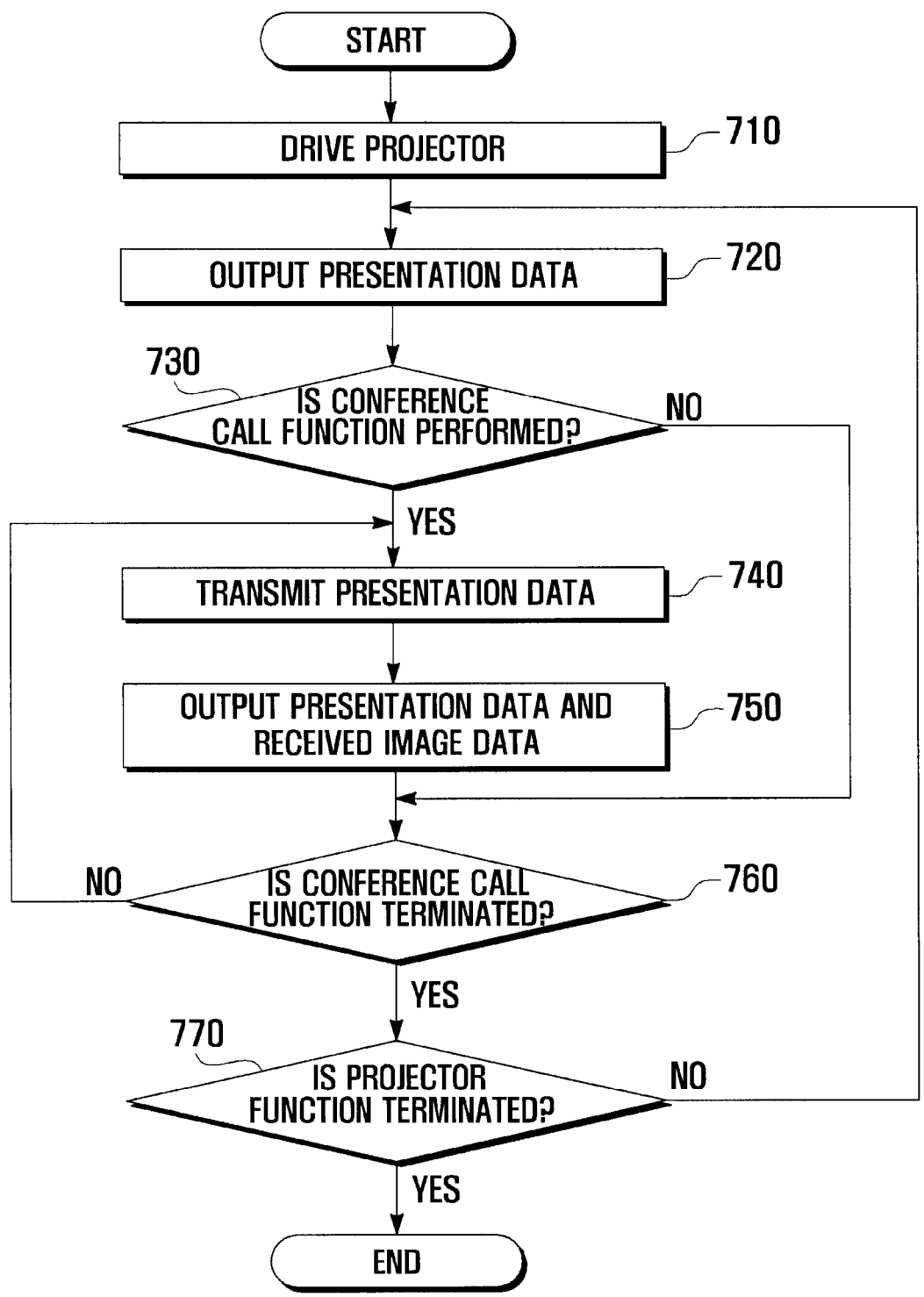
FIG. 7 is a flow chart that illustrates exemplary operation of a method for outputting presentation data according to another embodiment of the present invention.

FIG. 7 is a flow chart showing an operational example of a method for outputting presentation data according to another exemplary embodiment of the present invention.

Referring now to FIG. 7, at step (S710), when a user selects a projection function, the first portable terminal 100a drives its projector 110.

At step (S720), if the user has selected presentation data stored in the storage unit 140, the first portable terminal 100a outputs the selected presentation data via the projector 110.

At step (S730), the first portable terminal 100a determines whether a conference call function is performed. The conference call function refers to a function that allows the first portable terminal 100a to transmit the presentation data, output via the projector 110, to a second portable terminal 100b connected to the first portable terminal 100a. In an exemplary embodiment of the present invention, it is assumed that the conference call function is a video call function. The conference call function may be executed by the following two methods.

First, according to a user's selection, the first portable terminal 100a outputting presentation data via its projector 110 may perform an outgoing video call function to transmit a video call to another portable terminal, in this case the second portable terminal 100b. More specifically, the user selects a conference call function via a menu or a function key. In that case, the first portable terminal 100a displays on display unit 120 an input field for inputting a phone number of the second portable terminal 100b. When the user has input corresponding phone number into the input field, the first portable terminal 100a transmits a video call request signal to the second portable terminal 100b corresponding to the input phone number. After receiving a video call answer signal from the second portable terminal 100b, the first portable terminal 100a makes a video call with the second portable terminal 100b.

Second, the first portable terminal 100a outputs presentation data via its projector 110 and may perform a called video call function with second portable terminal 100b that has transmitted a video call request signal. More specifically, while outputting presentation data via the projector 110, the first portable terminal 100a receives a video call request signal from the second portable terminal 100b. In that case, the first portable terminal 100a displays a state indicating that the video call request signal is being received on the display unit 120. The first portable terminal 100a displays a selection window to select a conference call function, a video call function, or a call rejection function, on the display unit 120. If the user has selected a conference call function, the first portable terminal 100a outputs image data, transmitted from the second portable terminal 100b, and the presentation data, via the projector 110. After that, the first portable terminal 100a performs a conference call function to transmit the presentation data, output via the projector 110, to the second portable terminal 110b. If the user has selected a video call function, the first portable terminal 100a turns off the projector 110 and also a camera. After that, the first portable terminal 100a displays image data, transmitted from the second portable terminal 100b, and image data, acquired by the camera, on the display unit 120. The first portable terminal 100a transmits the image data acquired by the camera to the second portable terminal 100b. If the user has selected the call rejection function, the first portable terminal 100a transmits a guide message to the second portable terminal 100b.

At step (S730), when the first portable terminal 100a ascertains that a conference call function is performed, then at step (S740) the first portable terminal 100a transmits the presentation data to the other portable terminal. The first portable terminal 100a modulates the presentation data and generates packets in the video call format, such as H.263, H.264, MPEG4, etc., using a video codec. The first portable terminal 100a transmits the modulated packets and user data to the second portable terminal 100b.

At step (S750), the first portable terminal 100a outputs the presentation data and image data, transmitted from the second portable terminal 100b, via the projector 110.

At step (S760), the first portable terminal 100a determines whether a conference call function is terminated. If the portable terminal 100 ascertains that a conference call function is not terminated at 760, the method returns to and proceeds with step (S740).

On the contrary, if the first portable terminal 100a ascertains that a conference call function is terminated at step (S760), then at step (S770) the first portable terminal 100a further determines whether the projection function is terminated. If the first portable terminal 100a ascertains that the user has selected the termination of a projection function at step (S770), the procedure for outputting presentation data is terminated. On the contrary, if the first portable terminal 100a ascertains that the user has not selected the termination of a projection function at 770, the method returns to and proceeds with step (S720).

Meanwhile, if the first portable terminal 100a ascertains that a conference call function is not performed at step (S730), the method proceeds with step (S760).

As described above according to the present invention, a portable terminal with a projector can allow a user to share presentation data output from the projector with other remotely located users. In addition, through the projector, the portable terminal can output image data transmitted from other portable terminal during the video call, as well as presentation data. Furthermore, when the portable terminal performs a conference call function, an advantage is that people who do not physically attend a meeting or presentation are still able to participate therein.

A person of ordinary skill in the art should understand and appreciate that the first portable terminal and the second portable terminal may communicate via a base station or server using wireless communication technology.

Although exemplary embodiments of the present invention have been described in detail hereinabove, a person of ordinary skill in the art should understand that many variations and modifications of the basic inventive concept herein described, which may be apparent to those skilled in the art, will still fall within the spirit and scope of the exemplary embodiments of the present invention as defined in the appended claims.

What is claimed is:
1. A method comprising:
receiving an input via an apparatus during a video call;

identifying whether at least one function is associated with a projection during the video call based at least in part on the input;

modulating at least a portion of data corresponding to the at least one function associated with the projection;

transmitting, by the apparatus, to an external device in the video call, the at least a portion of the modulated data; and outputting via the apparatus, the at least a portion of the data for presentation during the video call.

2. The method of claim 1, wherein the input comprises a user input.

3. The method of claim 1, wherein the transmitting comprises:

obtaining the data from a camera operatively coupled with the apparatus.

4. The method of claim 1, wherein transmitting comprises:

selecting the data from a plurality of pieces of data stored in the apparatus.

5. The method of claim 1, wherein the data comprises identification information associated with the at least one function.

6. The method of claim 1, wherein the data comprises at least one of an image data, video data, or text data.

7. The method of claim 1, wherein further comprising:

presenting the data corresponding to the function via a projector operatively coupled with the apparatus.

8. A method comprising:

receiving data at an apparatus during a video call;

identifying that the data includes at least one function associated with a projection;

modulating at least a portion of data associated with the projection; and presenting, via an output device operatively coupled with the apparatus, the at least a portion of the modulated data based at least in part on a determination that the data includes identification information related to the output device, in which the presenting occurs during transmitting of another data generated by the apparatus to an external device in the video call.

9. The method of claim 8, wherein the output device comprises a projector.

10. The method of claim 8, wherein the data comprises at least one of an image data, video data or text data.

11. The method of claim 8, wherein the presenting comprises:

presenting the data via another output device operatively coupled with the apparatus.

12. The method of claim 8, wherein the identification information comprises at least one of an identifier of the external device participating in the video call with the apparatus, or information regarding a type of data.

13. An apparatus comprising:

a communication unit;

a processor operatively coupled with the communication unit, the processor configured to:

receive an input of data during a video call;

identify whether at least one function is associated with a projection of the data during the video call;

modulate at least a portion of the data associated with the projection;

select the at least a portion of the data to be transmitted to an external device in the video call based at least in part on the input;

present, via a projector operatively coupled with the apparatus, the at least a portion of the data during the video call; and transmit, via the communication unit, the at least a portion of the modulated data to the external device during the video call based at least in part on a determination that the at least a portion of the data is associated with the projection.

14. The apparatus of claim 13, wherein the input comprises a user input.

15. The apparatus of claim 13, wherein the data comprises at least one of an image data, video data or text data.

16. The apparatus of claim 13, wherein the selection of the data is from a plurality of pieces of data stored in the apparatus.

17. The apparatus of claim 13, wherein the data comprises:

identification information related to the projection.

18. The apparatus of claim 13, wherein the transmitting comprises:

generating packet data in a video format using a video codec.

19. The apparatus claim of 13, further comprising:

the data is presented via a projector operatively coupled with the processor.

20. The apparatus of claim 13, wherein the processor is further configured to:

refrain from transmission of the data to the external device based at least in part on a determination that the data is not associated with a projection.

* * * * *